(12) United States Patent
Kurokawa et al.

(10) Patent No.: US 8,493,046 B2
(45) Date of Patent: Jul. 23, 2013

(54) CONTROL DEVICE FOR DC/DC CONVERTER

(75) Inventors: Fujio Kurokawa, Nagasaki (JP); Hiroyuki Osuga, Tokyo (JP)

(73) Assignees: Nagasaki University, National University Corporation, Nagasaki-Shi, Nagasaki (JP); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/498,289

(22) PCT Filed: Sep. 30, 2010

(86) PCT No.: PCT/JP2010/067190
§ 371 (c)(1),
(2), (4) Date: Jun. 14, 2012

(87) PCT Pub. No.: WO2011/040591
PCT Pub. Date: Apr. 7, 2011

(65) Prior Publication Data
US 2012/0243265 A1    Sep. 27, 2012

(30) Foreign Application Priority Data

Sep. 30, 2009   (JP) .................................. 2009-229146

(51) Int. Cl.
*G05F 1/40*      (2006.01)
*H02M 3/335*     (2006.01)
(52) U.S. Cl.
USPC ...................... 323/283; 323/21.01; 323/56.01
(58) Field of Classification Search
USPC . 323/222, 271, 282–285, 351; 363/20–21.18, 363/50–58
See application file for complete search history.

(56) References Cited

U.S. PATENT DOCUMENTS

| | | | | |
|---|---|---|---|---|
| 6,956,361 B1 * | 10/2005 | Mozipo et al. | ................ | 323/283 |
| 7,109,695 B2 * | 9/2006 | King | .............................. | 323/283 |
| 7,459,893 B2 * | 12/2008 | Jacobs | ........................... | 323/282 |
| 7,567,445 B2 * | 7/2009 | Coulson et al. | ............ | 363/21.12 |
| 7,876,075 B1 * | 1/2011 | Chiu et al. | ..................... | 323/229 |

FOREIGN PATENT DOCUMENTS

| | | |
|---|---|---|
| JP | 2-501884 A | 6/1990 |
| JP | 2004-120940 A | 4/2004 |
| JP | 2005-021857 A | 1/2005 |
| JP | 2006-042565 A | 2/2006 |
| JP | 2008-125286 A | 5/2008 |
| JP | 2009-526365 | 7/2009 |
| WO | 2009/001615 A1 | 12/2008 |

* cited by examiner

*Primary Examiner* — Jessica Han
(74) *Attorney, Agent, or Firm* — Kile Park Reed & Houtteman PLLC

(57) ABSTRACT

Disclosed herein is a control device for a DC/DC converter, in which FB control and FF control are combined to estimate an output voltage of a nonlinear dynamic system while guaranteeing stability. The control device includes a FB controller which generates a first time value for switch-off timing as the amount of feedback control, a machine learning controller which generates a second time value for switch-off timing as the amount of FF control, and a difference time calculator which obtains a difference between the first time value and the second time value and transmits a difference signal to the drive circuit. The machine learning controller calculates a second time value by multiplying the deviation between the target value of the machine learning control and the estimation value from leaning history in certain sampling by $\alpha = A \cdot \exp(-\lambda \times n)$ (A: a factor (except for zero) for suppressing the first undershoot, $\lambda$: a factor (constant except for zero) for suppressing the second undershoot, and n: an integer indicating the nth sampling).

6 Claims, 10 Drawing Sheets

(A)

(B)

(A)

(B)

CONTROL DEVICE FOR DC/DC CONVERTER

TECHNICAL FIELD

The present invention relates to a control device for a DC/DC converter, in which feedback control with feedforward control (for example, neuro-control) based on machine learning are combined to estimate an output voltage of a nonlinear dynamic system while guaranteeing stability.

BACKGROUND ART

DC/DC converters provided with a control circuit for feedback control and feedforward control are known in the art (refer to Patent Documents 1, 2, etc.).

PRIOR ART DOCUMENT

Patent Document (Patent Document 1) Japanese Patent Publication No. 2005-21857
(Patent Document 2) Japanese Patent Publication No. 2004-120940
(Patent Document 3) Japanese Patent Publication No. 2006-042565

DISCLOSURE

Technical Problem

When overshoot (or undershoot) is suppressed in feedforward control, a control device often behaves to promote subsequent undershoot (or overshoot) under a certain condition (refer to Patent Document 3 with regard to a technique for decreasing overshoot).

One object of the present invention is to provide a control device for a DC/DC converter, in which feedback control and feedforward control (for example, machine learning control such as neuro-control) are combined to estimate an output voltage of a nonlinear dynamic system while guaranteeing stability.

Technical Solution

A control device for a DC/DC converter in accordance with the present invention is summarized as follows.

(1) A control device for a DC/DC converter, which obtains at least one of an output voltage value, an output current value, an input voltage value, an inductor current value and a capacitor current value of the DC/DC converter, and transmits a switch on/off instruction signal to a drive circuit, the control device including:

a feedback controller which generates a first time value for switch-off timing as the amount of feedback control from the at least one of the output voltage value, the output current value, the input voltage value, the inductor current value, and the capacitor current value of the DC/DC converter;

a machine learning controller which generates a second time value for switch-off timing as the amount of control from the at least one of the output voltage value, the output current value, the input voltage value, the inductor current value, and the capacitor current value of the DC/DC converter; and a difference time calculator which obtains a difference between the first time value from the feedback controller and the second time value from the machine learning controller, and transmits a difference signal to the drive circuit, wherein the machine learning controller multiplies a deviation between a control target value at a certain sampling and a control estimation value obtained from learning history by a weight of $\alpha = A \cdot f(n \cdot \lambda)$, where A is a factor (except for zero) for suppressing the first undershoot or overshoot, $f(n, \lambda)$ is a damping function, $\lambda$ is a factor (positive constant except for zero) for suppressing the second overshoot or undershoot, and n is an integer indicating the nth sampling, and calculates the second time value by imparting a bias component to the weighted value.

That is, when the control target value is $X^*$ and the control estimation value is $X$, the amount of control may be represented by $\alpha \times (X^* - X)$. At this time, an offset B may be added to the amount of control.

The first undershoot or overshoot is controlled by multiplying the amount of control based on machine learning by a large gain A. Further, when the amount of control based on machine learning is multiplied by the original gain A with regard to overshoot or undershoot immediately thereafter, it is over-compensation. Thus, the damping function ($f(n, \lambda)$) is used to significantly decrease the effect of the gain.

(2) The control device according to Item (1), wherein $f(n, \lambda)$ is $\exp(-\lambda \times n)$.

(3) The control device according to Item (1) or (2), wherein the machine learning controller comprises a memory unit which stores a calculated value of the second time value, a calculation start condition of the second time value, and a parameter for calculation of the second time value. Here, the parameter is at least one of the output voltage value, the output current value, the input voltage value, the inductor current value, and the capacitor current value.

(4) The control device according to Item (3), wherein the machine learning controller obtains resistance or impedance of load before and after transient variation from the output voltage and the output current of the DC/DC converter, and refers to a control estimation value corresponding to the resistance or impedance of the load from the memory unit.

(5) The control device according to Item (3), wherein the machine learning controller obtains resistance or impedance of load before and after transient variation from the input voltage and the output current of the DC/DC converter, and refers to a control estimation value corresponding to the resistance or impedance of the load from the memory unit.

(6) The control device according to Item (1), further comprising a clock selector selecting one clock from among a plurality of external clock signals, wherein generation timing of switching noise is synchronized with variation of load by synchronizing switch-on timing of the switch circuit with a selected external clock signal.

Advantageous Effects

According to the present invention, in order to control output $N_{Ton}$ of a difference time calculator, a machine learning controller such as a neuro controller having a multi-layered neural network is served as a feedforward controller, and a feedback controller is also used in the controller. Therefore, the present invention may permit estimation of a nonlinear dynamic system and guarantee stability based on the feedback controller.

According to the present invention, a second time value (the amount of machine learning control) is obtained by multiplying a deviation between a target value of machine learning control and an estimation value of the machine learning control in certain sampling by $[A \cdot \exp(-\lambda \times n)]$ (A: a factor (except for zero) for suppressing the first undershoot or overshoot, λ: a factor (positive constant except for zero) for suppressing the second overshoot or undershoot, n: an integer indicating the nth sampling). With this configuration, the control device according to the present invention may suppress the first undershoot or overshoot while dampening the second and next overshoot or undershoot.

DETAILED DESCRIPTION

Figure 1:
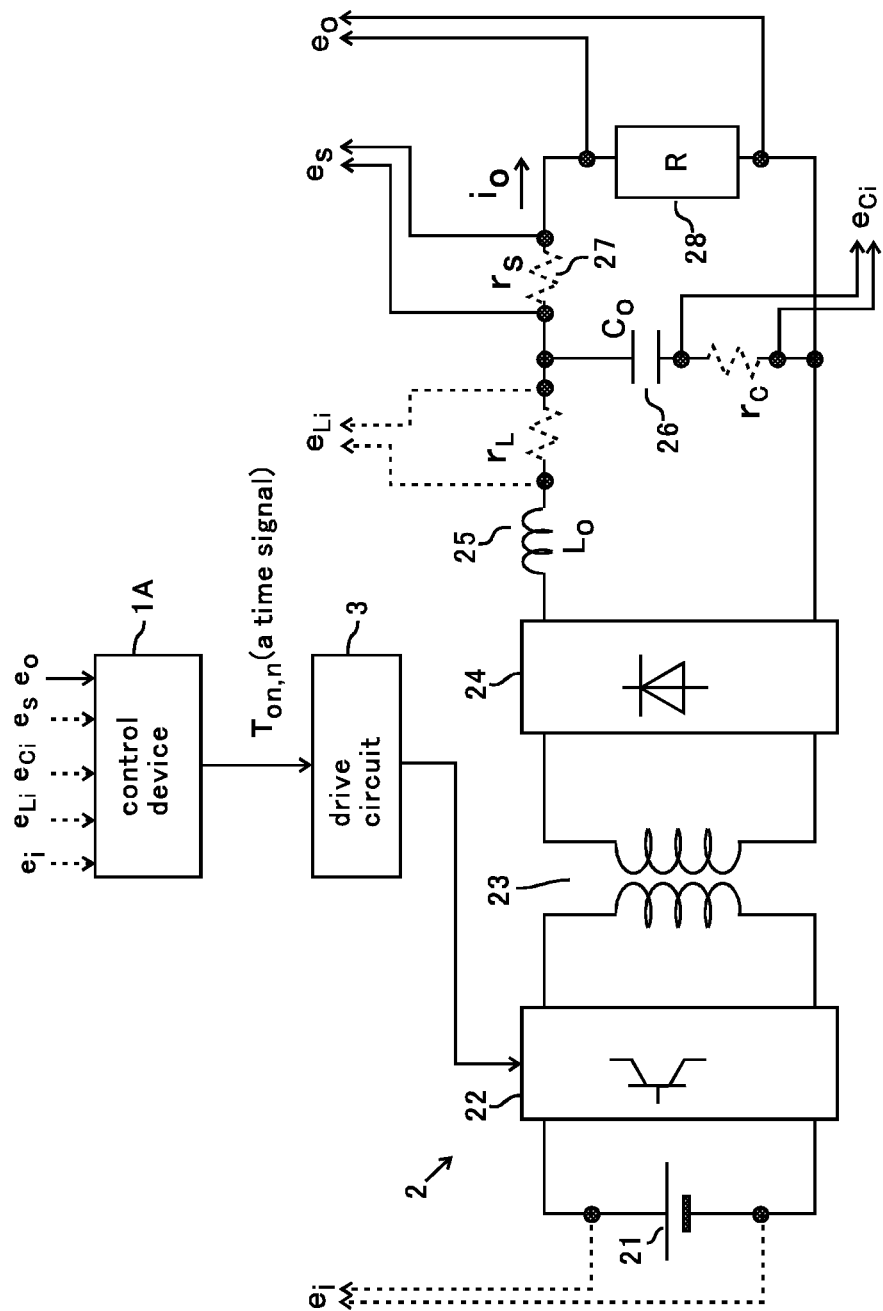
FIG. 1 is a schematic diagram of a DC/DC converter to which a control device in accordance with the present invention is applied.

FIG. 1 is a schematic diagram of a DC/DC converter to which a control device in accordance with the present invention is applied.

In FIG. 1, a DC/DC converter 2 includes a switch circuit 22, a transformer 23, a rectifier 24, a smoothing inductor 25 $L_o$, and an output capacitor 26 $C_o$. An inductor current detecting resistor $r_L$ is connected in series to the smoothing inductor 25, a capacitor current detecting resistor $r_c$ is connected in series to the output capacitor 26, and an output current detecting resistor 27 $r_s$ is connected in series to a load 28 described later. In addition, a DC power source 21 is connected to an input side of the DC/DC converter 2, and the load 28 R is connected to an output side thereof. For convenience, FIG. 1 shows a battery as the DC power source 21, but the present invention is not limited thereto. Alternatively, a DC supply terminal may be employed as the DC power source 21. Likewise, a DC resistor R is shown as the load 23, but the present invention is not limited thereto. Alternatively, an AC resistor (impedance) may be employed as the load 23. Meanwhile, $r_s$, $r_L$ and $r_c$ may be omitted, and thus their symbols are shown as dotted lines in FIG. 1.

In FIG. 1, at least one of an output voltage $e_o$, an output current $i_o$ (detected value $e_s$), an input voltage (DC power source voltage) $e_i$, an inductor current $i_L$ (detected value $e_{Li}$), and a capacitor current $i_c$ (detected value $e_{Ci}$) is transmitted to a control device 1A, and the control device 1A transmits a timing instruction value (a time signal $T_{on,n}$) for turning on the switch circuit 22 to a drive circuit 3.

Figure 2:
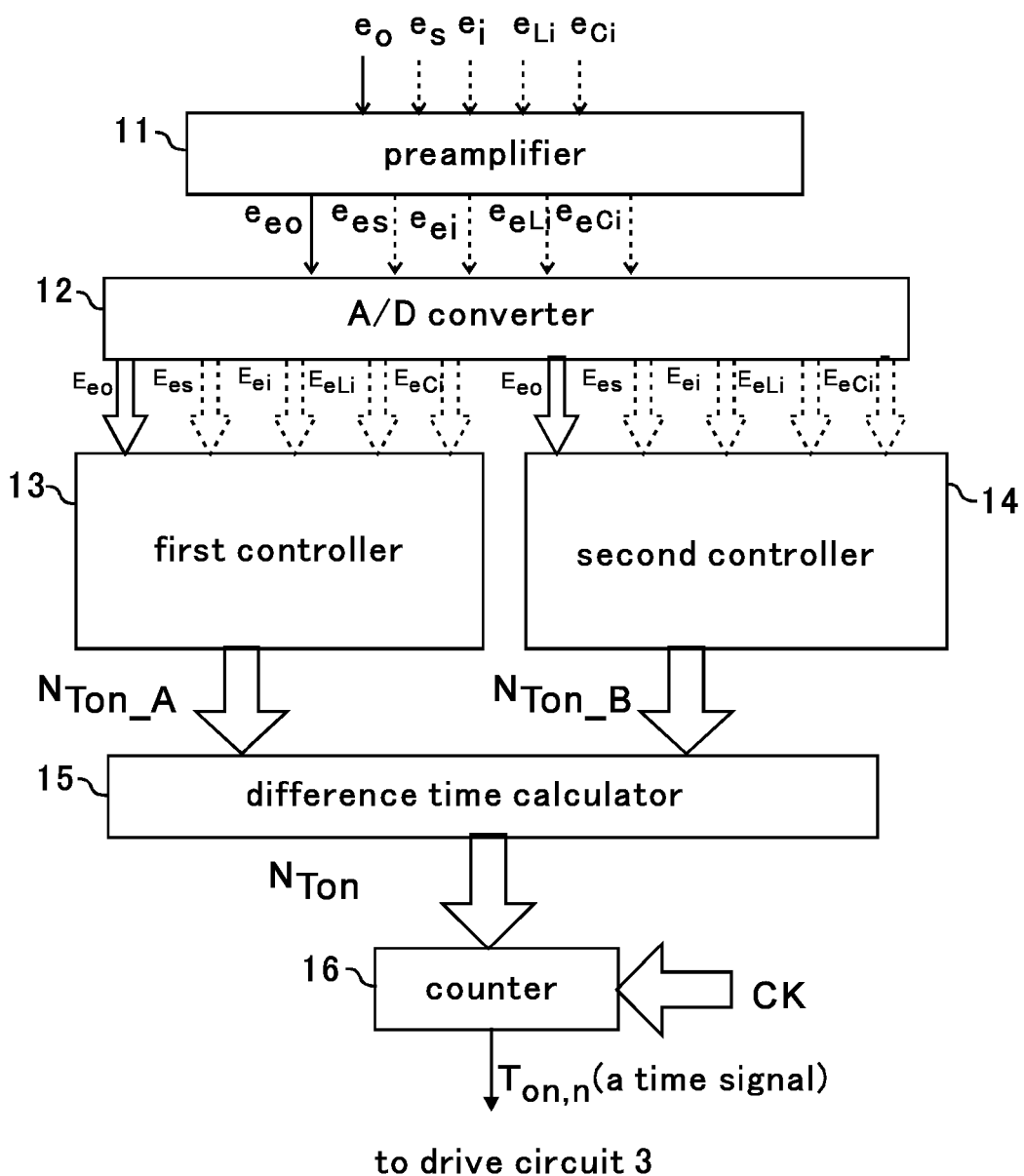
FIG. 2 is a functional block diagram of the control device of FIG. 1.

FIG. 2 is a schematic view of the control device 1A of FIG. 1.

The control device 1A includes a preamplifier 11, an A/D converter 12, a first controller (for example, a PID controller) 13, a second controller 14, a difference time calculator 15, and a counter 16.

The preamplifier 11 receives and amplifies at least one of the output voltage $e_o$, the output current $i_o$ (detected value $e_s$), the input voltage (DC power source voltage) $e_i$, the inductor current $i_L$ (detected value $e_{Li}$), and the capacitor current $i_c$ (detected value $e_{Ci}$), and outputs the received value as $e_{eo}$, $e_{es}$, $e_{ei}$, $e_{eLi}$, $e_{eCi}$. The A/D converter 12 converts such output values into digital signals $E_{eo}$, $E_{es}$, $E_{ei}$, $E_{eLi}$, and $E_{eCi}$, respectively. Meanwhile, the digital signals $E_{es}$, $E_{ei}$, $E_{eLi}$, and $E_{eCi}$ may be omitted, and thus arrows indicating data streams are shown as dotted lines in FIG. 2.

The first controller (feedback controller) 13 receives at least one of the digital signals $E_{eo}$, $E_{es}$, $E_{ei}$, $E_{eLi}$ and $E_{eCi}$, and generates a first time value $N_{Ton\_A,n}$ for switch-off timing as the amount of feedback control (where, n is a subscript indicating the $n^{th}$ sampling).

The second controller 14, which is a machine learning controller such as a neuro controller, receives at least one of the digital signals $E_{eo}$, $E_{es}$, $E_{ei}$, $E_{eLi}$, and $E_{eCi}$, and generates a second time value $N_{Ton\_B}$ as the amount of control for the switch-off timing.

Also, the second time value $N_{Ton\_B}$ may be expressed as follows.

$$N_{Ton\_B} = \alpha_n(N_{eo,n}^* - N_{eoEst,n}) \tag{1}$$

For example, $N_{eo,n}^*$ may be a target value with regard to the $n^{th}$ sampling and $N_{eoEst,n}$ may be an estimated value in the $n^{th}$ sampling. Here, n is the number of samplings after variation.

Further, $\alpha_n$ is a damping function, which can be typically represented by the following expression (2).

$$\alpha_n = A \cdot \exp(-\lambda \times n) \tag{2}$$

As described above, n is a subscript indicating the $n^{th}$ sampling. Also, A and λ are values such as A=90 and λ=50,000, which may be determined, for example, by simulation and by well-known control theories (adaptive control theory•optimal control theory, etc.) (In this case, values such as $N_{eo,n}^*$, $N_{eoEst,n}$, $d(N_{eo,n}^*)/dn$, $d(N_{eo,n})/dn$ may be used for reference.)

$\alpha_n$ may be expressed as follows.

$$\alpha_n = A \cdot \exp(-\lambda \times n) \tag{2}$$

For instance, A=90 and λ=50,000.

The difference time calculator 15 obtains a difference between the first time value from the first controller 13, and the second time value from the second controller 14 and transmits this difference to the counter 16.

When counting up, the counter 16 transmits a timing instruction value (time signal $T_{ON}$) for turning on the switch circuit 22 to the drive circuit 3.

Figure 3:
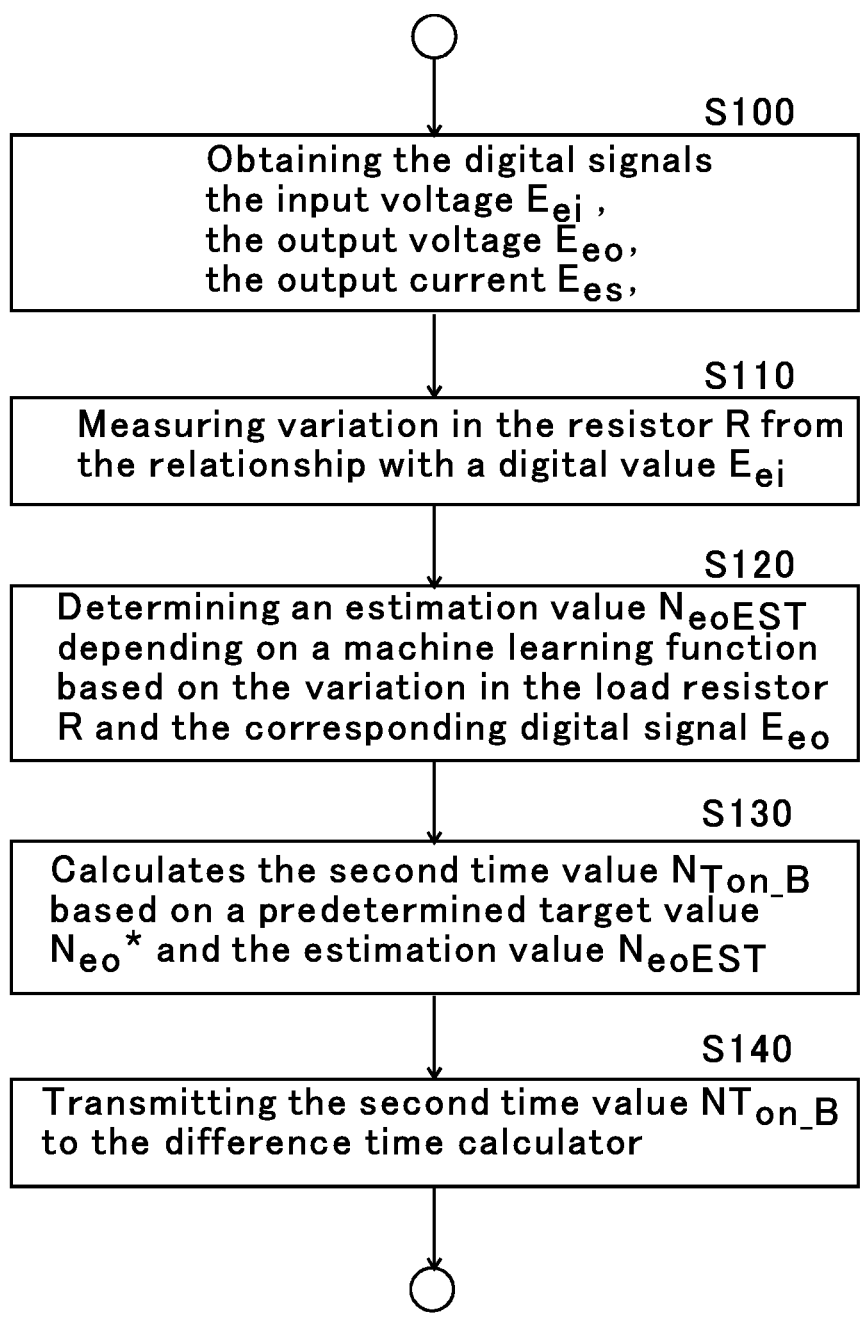
FIG. 3 is a flowchart of a process for estimation based on a detected value of an output voltage in the control device of FIG. 2.

The process of the second controller 14 for estimation is based on an output voltage detection value $e_o$ and will be described with reference to FIG. 3. Also, in this example, the second controller (machine learning controller such as a neuro controller) 14 obtains the digital signals $E_{eo}$, $E_{es}$, $E_{ei}$ corresponding to the output voltage $e_o$, the output current $i_o$, and the input voltage $e_i$.

When obtaining the digital signals $E_{eo}$, $E_{es}$, $E_{ei}$ (S100), the second controller 14 measures variation in the resistor R from the relationship with a digital value $E_{ei}$ (S110). Here, variation in resistance of the load resistor R with regard to a certain voltage of the input voltage $e_i$ is measured. The value of the load resistor R is calculated in a predetermined sampling cycle from the digital signal $E_{eo}$ corresponding to the output voltage $e_o$ and the digital signal $E_{es}$ corresponding to the output current $e_i$.

Further, the second controller 12 determines an estimation value $N_{eoEST}$ depending on a machine learning function based on the variation in the load resistor R and the corresponding digital signal $E_{eo}$ (S120). Specifically, the estimation value $N_{eoEST}$ may be determined by the neuro theory.

For example, if there is variation in the load resistor R, variations in the load resistor R and the corresponding digital signal $E_{eo}$ are observed and the estimation value $N_{eoEST}$ to be expected as the optimum value can be calculated.

That is, the second controller 12 learns a situation of variation from when the variation occurs once to when it is processed, and thus performs a feedforward operation to suppress the variation at the next time. Even in this case, the first controller 13 operates to correspond to feedforward variation as well as the variation in the load R, thereby exponentially and rapidly damping the feedforward operation (refer to Expression (2)).

Further, the second controller 12 calculates the second time value $N_{Ton\_B}$ based on a predetermined target value $N_{eo}*$ and the estimation value $N_{eoEST}$ obtained in operation S120 (S130), and transmits the second time value $N_{Ton\_B}$ to the difference time calculator 15 (S140).

Figure 4:
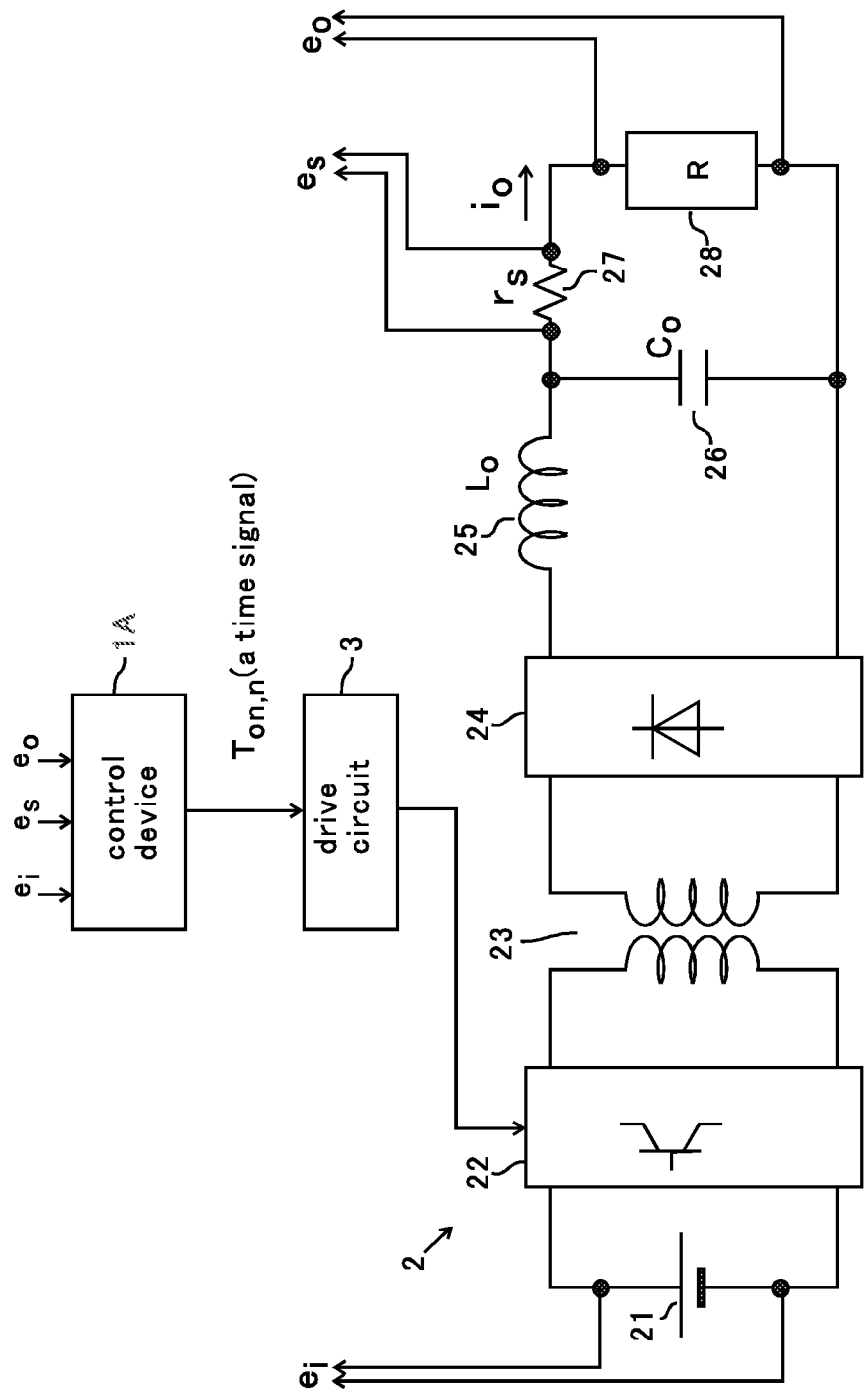
FIG. 4 is a diagram of the DC/DC converter of FIG. 1 with limited control parameters.
Figure 5:
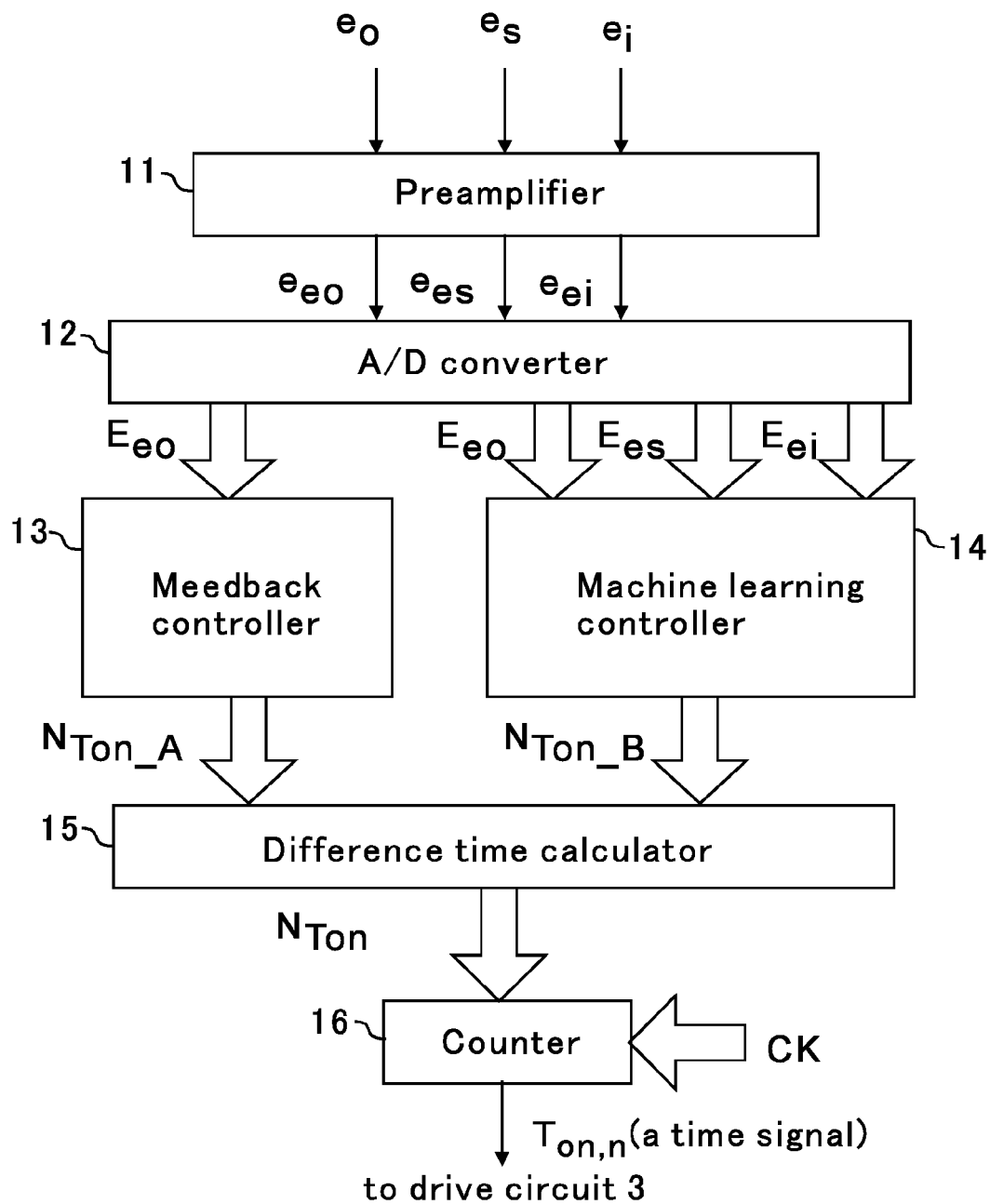
FIG. 5 is a functional block diagram of the control device of FIG. 4, which is provided with a feedback controller and a machine learning controller.

FIG. 4 shows the DC/DC converter 2 of FIG. 1 with limited control parameters, and FIG. 5 is a functional block diagram of the control device 1A of FIG. 4, which is provided with the first controller (feedback controller) 13 and the second controller (machine learning controller) 14.

In FIG. 4, the output voltage $e_o$, the output current $i_o$, and the input voltage $e_i$ are transmitted to the control device 1A, and the control device 1A calculates the timing instruction value (time signal $T_{ON}$) for turning on the switch circuit 22 on the basis of these values and transmits the calculated value to the drive circuit 3.

In FIG. 5, the control device 1A includes the preamplifier 11, the A/D converter 12, the first controller (a feedback controller such as a PID controller) 13, the second controller (a machine learning controller such as a neuro controller) 14, the difference time calculator 15, and the counter 16.

The preamplifier 11 receives and amplifies the output voltage $e_o$, the output current $e_s$, and the input voltage $e_i$ from the DC/DC converter 2, and outputs the amplified values as $e_{eo}$, $e_{es}$, and $e_{ei}$. The A/D converter 12 converts these values into the digital signals $E_{eo}$, $E_{es}$, $E_{ei}$, respectively.

The first controller (feedback controller) 13 obtains the digital signal $E_{eo}$ (corresponding to the output voltage $e_o$), and generates the first time value $N_{Ton\_A,n}$ for switch-off timing as the amount of feedback control (where n is a subscript indicating the $n^{th}$ sampling).

The first time value (the amount of feedback control) is based on typical feedback control, which is, for example, expressed as follows $$N_{Ton\_A,n}=K_P(N_{eo,n-1}-N_R)+K_I \Sigma N_{I,n-1}+K_D(N_{eo,n-1}-N_{R-1}) \quad (3)$$

The second controller (machine learning controller) 14 includes a memory unit which stores a variation situation of the load resistor R from the relationship with the digital value $E_{ei}$ of the input voltage $e_i$. Also, the second controller (machine learning controller) 14 receives the digital signal $E_{eo}$ (corresponding to the output voltage $e_o$), the digital signal $E_{es}$ (corresponding to a voltage conversion value $e_s$ of the output current) and the digital signal $E_{ei}$ (corresponding to the input voltage $e_i$) and generates the second time value $N_{Ton\_B,n}$ for switch-off timing as the amount of machine learning control.

The second controller (machine learning controller) 14 may perform feedforward control. Using three previous sampling data $E_{eo-1}$, $E_{eo-2}$, $E_{eo-3}$, it is possible to estimate the nth $N_{eoEst,n}$ (This means that the nth sampling value $E_{eo-n}$ of the output voltage $e_o$ is estimated).

Thus, when the second controller (machine learning controller) 14 is the neuro controller, the number of input units is 3. The number of hidden units is twice the number of input units, i.e., 6, and a sigmoid function is used as an active function. Further, a multiplying parameter is randomly initialized and learned by a back-propagation algorithm based on a mean square error function.

The second time value (the amount of machine learning control) is expressed by multiplying a deviation between a control target value $N_{eo}*$ and a control estimation value $N_{eoEst}$ in certain sampling by $\alpha_n$ as follows.

$$N_{Ton\_B}=\alpha_n(N_{eo}*-N_{eoEst}) \quad (4)$$

For example, $N_{eo}*$ is a target value for the nth sampling, and $N_{eoEst}$ is an estimation value for the nth sampling.

$\alpha_n$ is expressed as follows.

$$\alpha_r=A \cdot \exp(-\lambda \times n) \quad (5)$$

For example, let A=90, and $\lambda$=50,000.

A is a factor (constant) for suppressing the first undershoot or overshoot, and $\lambda$ is a factor (positive constant) for suppressing the second and subsequent overshoot or undershoot.

The difference time calculator 15 calculates difference between the first time value from the first controller (feedback controller) 13 and the second time value from the second controller (machine learning controller) 14, and outputs this difference to the drive circuit 3.

If the number of data points is 1000 corresponding to, for example, switching frequencies, an estimation value of $e_{o-n}$ is obtained after repetition (1000 times in this case) involving a back-propagation algorithm using the learning data, and the second time value $N_{eoEst}$ is then obtained.

Figure 6:
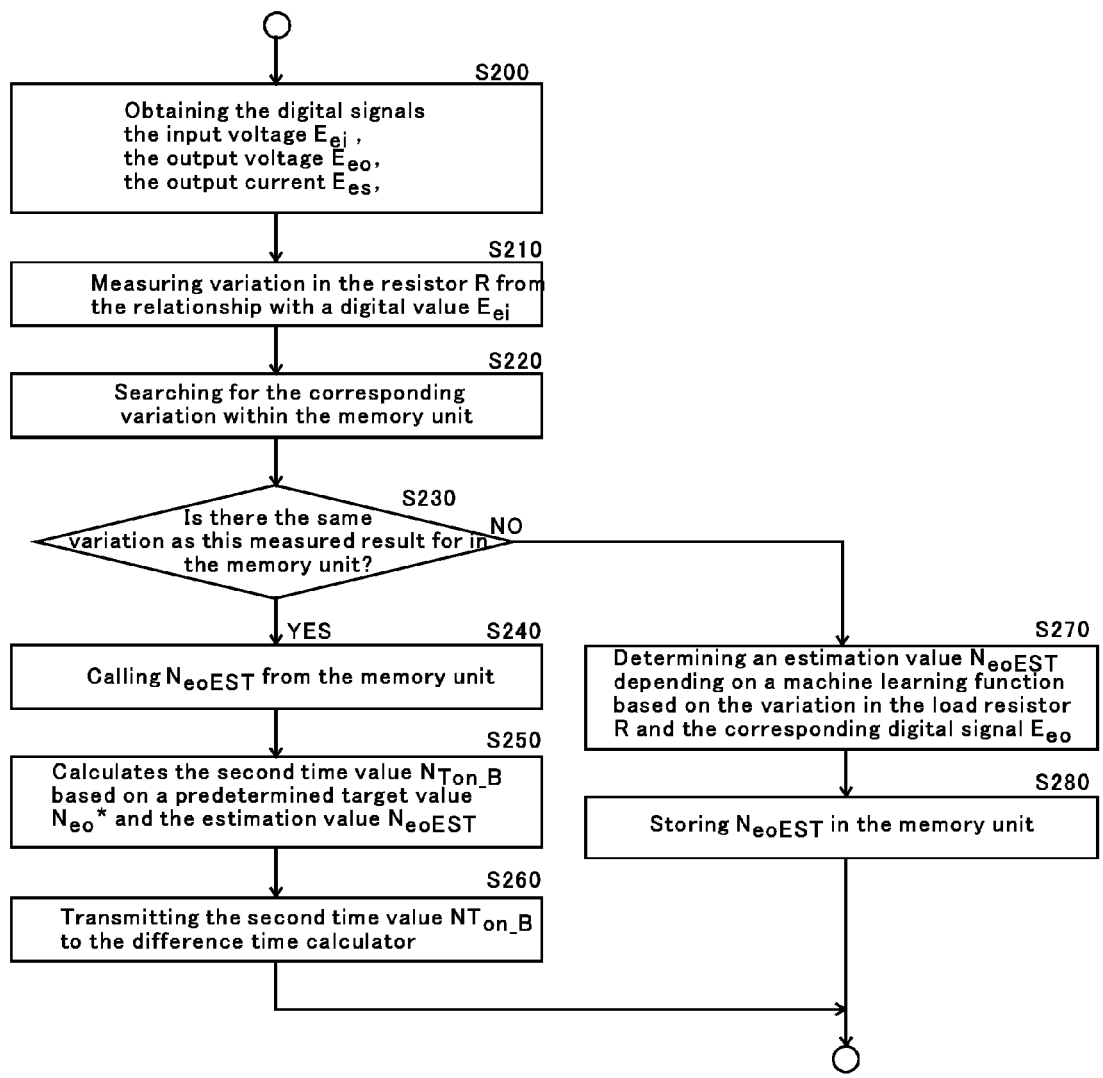
FIG. 6 is a flowchart of a process for estimation based on a detected value of an input voltage, a detected value of an output voltage, and a detected value of an output current in the machine learning controller of the control device of FIG. 5.

In the case where estimation is based on the output voltage $e_o$, the output current $i_o$, and the input voltage $e_s$, the process of the second controller (machine learning controller) 14 will be described with reference to FIG. 6. In this example, the second controller (machine learning controller) 14 of FIG. 5 obtains the digital signal $E_{eo}$, the output current $E_{es}$ and the input voltage $E_{ei}$ corresponding to the output voltage $e_o$, the output current $i_o$, and the input voltage $e_s$.

If the second controller (machine learning controller) 14 obtains the digital signal $E_{eo}$, $E_{es}$ and $E_{ei}$ (S200), the variation of the load resistor R is measured from the relationship with the digital value $E_{ei}$ of the input voltage (S210). Here, variation in resistance of the load resistor R with regard to a certain voltage of the input voltage $e_i$ is measured.

The same variation as this measured result is searched for in the memory unit (S220). For example, if the load resistor R is varied from R×1 ohms to R×2 ohms (R×1, R×2: resistance) when the input voltage $e_i$ has Ex V (Ex: voltage), it is searched for whether the memory unit stores the variation of the load resistor R from R×1 ohms to R×2 ohms when the input voltage $e_i$ has Ex V.

If the corresponding variation is searched for within the memory unit ("YES" in S230), the estimation value $N_{eoEST}$ is called from the memory unit (S240), and the second time value $N_{Ton\_B}$ is calculated from the target value $N_{eo}^*$ and the estimation value $N_{eoEST}$ (S250). Then, the calculated second time value $N_{Ton\_B}$ is transmitted to the difference time calculator 15 (S260).

In operation S230, not the same but similar variation may be regarded as "the same variation." The reference for "the same variation" may be properly defined. For example, if the load resistor R is varied from R×1 ohm to R×2 when the input voltage $e_i$ has Ex V, this variation may be the same as variation where the resistance R is varied from (1±0.2)×R×1 to (1±0.2)×R×2 when the input voltage $e_i$ has (1±0.2)×Ex V, Further, even when "the same variation" is present in the memory unit ("YES" at S230), if it is not in a proper similar range (for example, if the voltage before and/or after the variation voltage is within a range greater than or equal to 5% and less than 10%), the variation and the estimation value at this time may be stored in the memory unit.

In operation 5230, if the corresponding variation is not present in the memory unit ("NO" at S230), the estimation value $N_{eoEST}$ is determined depending on the variation of the load resistor R and the corresponding digital signal $E_{eo}$ (S270), and this estimation value $N_{eoEST}$ is stored in the memory unit (S280).

In this embodiment, the estimation value $N_{eoEST}$ may be specifically determined by the neuro theory. For example, if variation occurs in the load resistor R, the variations in the load resistor and the corresponding digital signal $E_{eo}$ are observed, and the estimation value $N_{eoEST}$ to be expected as the optimum can be simply calculated.

That is, the second controller 12 learns a situation of variation from when the variation occurs once to when it is processed, and thus performs a feedforward operation to suppress the variation at the next time. Even in this case, the first controller 13 operates to correspond to feedforward variation as well as the variation in the load R, thereby exponentially and rapidly damping the feedforward operation (refer to Expression (5)).

Further, the second controller 12 calculates the second time value $N_{Ton\_B}$ based on a predetermined target value $N_{eo}^*$ and the estimation value $N_{eoEST}$ obtained in operation S120 (S130), and transmits the second time value $N_{Ton\_B}$ to the difference time calculator 15 (S140).

Figure 7:
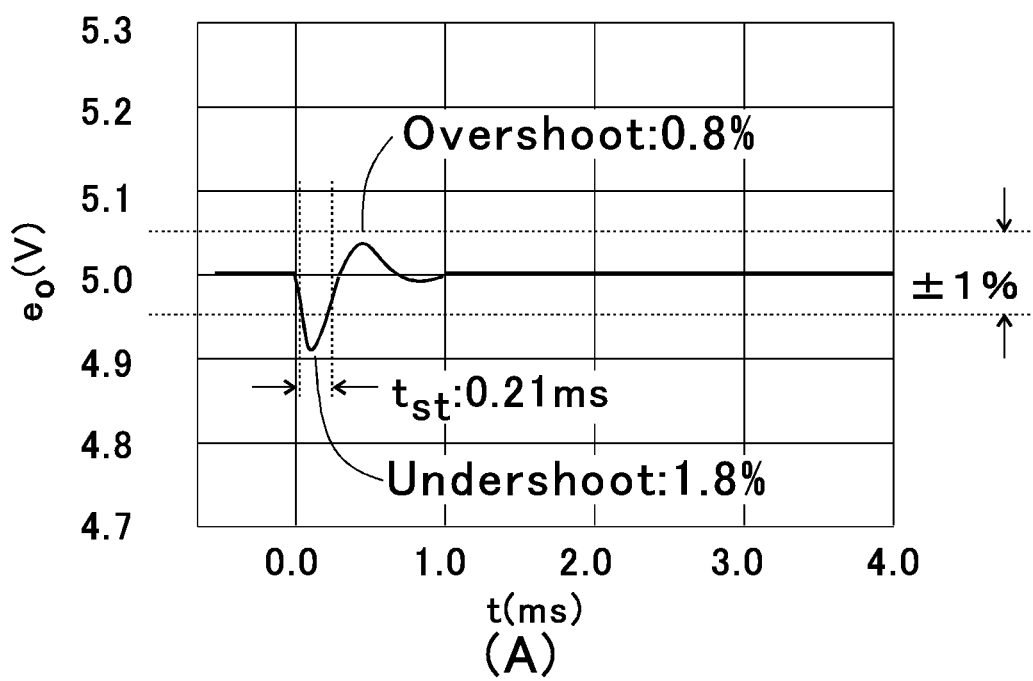
FIG. 7(A) shows a transient characteristic of an output voltage when machine learning control is not performed.
FIG. 7(B) shows a transient characteristic of an output current when machine learning control is not performed.
Figure 7:
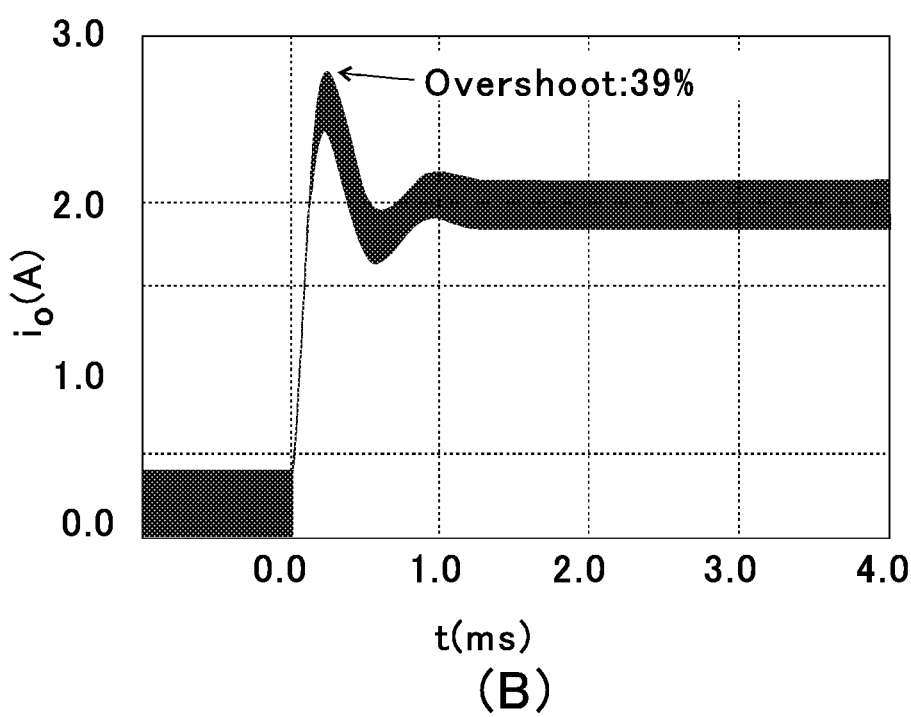

Using the control device 1A of FIG. 4, it is possible to accept transient characteristics of an output voltage shown in FIG. 7(A) and transient characteristics of an output current shown in FIG. 7(B) by approximate sampling (1000 times/sec)

Figure 8:
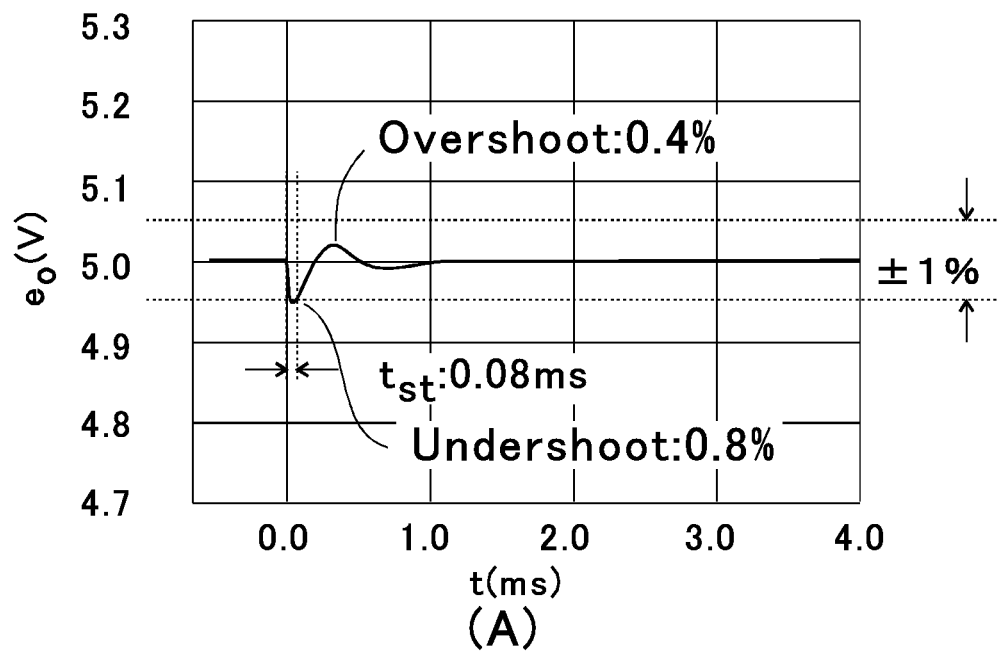
FIG. 8(A) shows a transient characteristic of an output voltage when machine learning control is performed.
FIG. 8(B) shows a transient characteristic of an output current when machine learning control is performed.
Figure 8:
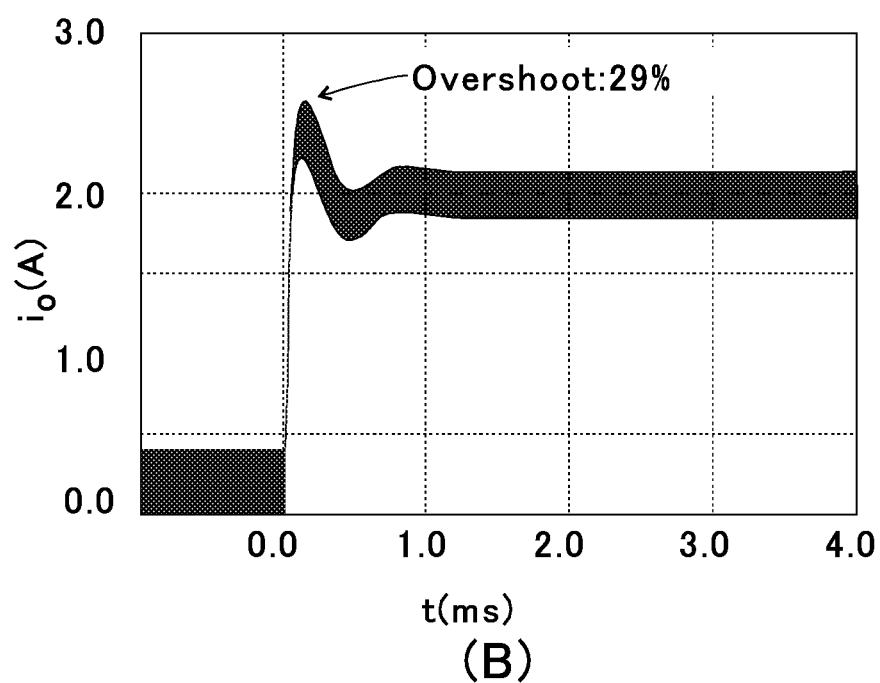

Further, the machine learning function (for example, the neural network in neuro control) is used to estimate the operation, so that overshoot or undershoot can be reduced as shown in the transient characteristics of the output voltage in FIG. 8(A) and the transient characteristics of the output current in FIG. 8(B).

This estimation value is stored, and the difference from the output voltage is obtained by Expression (2) and modified by Expression (3), thereby achieving good transient characteristics.

Accordingly, learning is performed only at first, and estimation based on the learning result is performed next when such a phenomenon occurs. Furthermore, modification is performed in Expression (3), thereby realizing good transient characteristics.

The resistance R of the load 28 is detected before and after step variation, and learning•estimation corresponding to combination of such detected resistances is stored in the memory unit. Then, modification is performed based on learning•estimation. Further, as shown in Expression (1), a feedback component is processed by conventional feedback control, and components corresponding to the feedforward $N_{Ton\_1}$ are processed by learning•estimation•modification.

Table 1(A) shows an example of comparison between PID control and inventive control (PID control+machine learning (neuro) control) with respect to the behavior upon undershoot•overshoot of an output voltage $e_o$, and the length of processing time $t_{st}$, and Table 1(B) shows an example of comparison between the PID control and the inventive control (PID control+machine learning (neuro) control) with respect to the behavior upon overshoot of an inductor current.

TABLE 1

| | PID control | PID + Neuro control |
|---|---|---|
| Undershoot (%) | 1.8 | 1.0 |
| Overshoot (%) | 0.8 | 0.4 |
| $t_{st}$ (ms) | 0.21 | 0.08 |
| Behavior of output voltage $e_o$ (A) | | |
| Overshoot (%) | 39 | 29 |
| Behavior of inductor current $i_o$ (B) | | |
| Undershoot (%) | 1.8 | 1.0 |
| Overshoot (%) | 0.8 | 0.4 |
| $t_{st}$ (ms) | 0.21 | 0.08 |
| Behavior of output voltage $e_o$ (A) | | |
| Overshoot (%) | 39 | 29 |
| Behavior of inductor current $i_o$ (B) | | |

Figure 9:
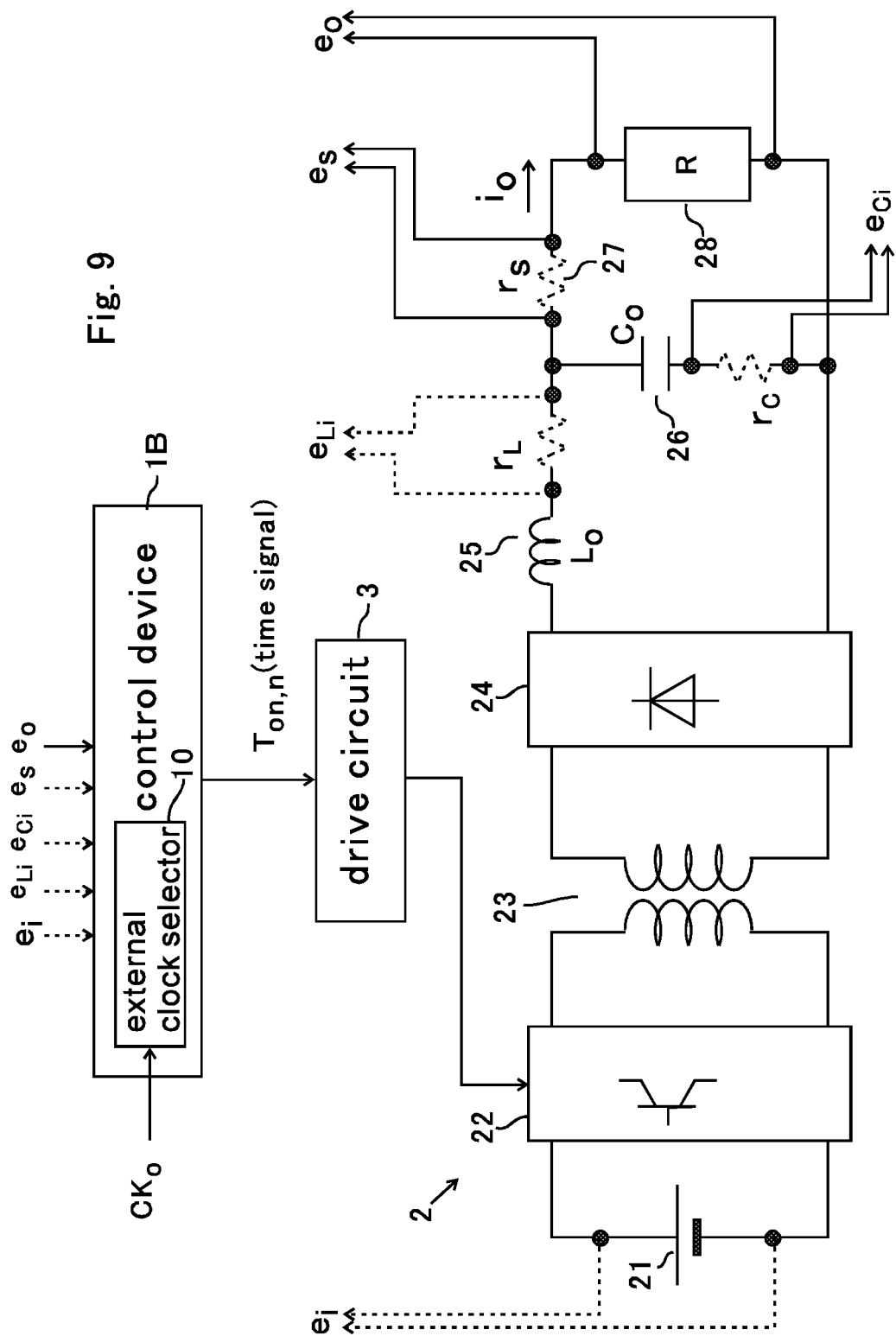
FIG. 9 is a schematic diagram of another example of a DC/DC converter to which a control device in accordance with the present invention is applied.

FIG. 9 is a schematic diagram of another example of a DC/DC converter to which a control device in accordance with the present invention is applied.

In FIG. 9, a DC/DC converter 2 includes a switch circuit 22, a transformer 23, a rectifier 24, a smoothing inductor 25 $L_o$, and an output capacitor 26 $C_o$. An inductor current detecting resistor $r_c$ is connected in series to the smoothing inductor 25, a capacitor current detecting resistor $r_c$ is connected in series to the output capacitor 26, and an output current detecting resistor 27 $r_s$ is connected in series to a load 28.

Also, a DC power source 21 is connected to an input side of the DC/DC converter 2, and the load 28 R is connected to an output side thereof. For convenience, FIG. 9 shows a battery as the DC power source 21, but the present invention is not limited thereto. Alternatively, a DC supply terminal may be employed as the DC power source 21. Likewise, a DC resistor R is shown as the load 23, but the present invention is not limited thereto. Alternatively, an AC resistor (impedance) may be employed as the load 23. Meanwhile, $r_s$, $r_L$ and $r_c$ may be omitted, and thus their symbols are shown as dotted lines in FIG. 9.

In FIG. 9, at least one of an output voltage $e_o$, an output current $i_o$ (detected value $e_s$), an input voltage $e_i$, an inductor current $i_L$ (detected value $e_{Li}$), and a capacitor current $i_c$ (detected value $e_{Ci}$) is transmitted to an external synchronization control device 1B, and the control device 1B transmits a timing instruction value (a time signal $T_{on,n}$ for turning on the switch circuit 22 to a drive circuit 3).

This timing instruction value has a mechanism to be synchronized with an external clock signal.

To this end, a variation signal of the load may have the same frequency as the external clock signal $CK_o$ or a frequency higher or lower integer times of the external clock signal $CK_o$, so that timing for turning on the switch circuit 22 can be synchronized with variation of the load.

Therefore, timing of switching noise in the DC/DC converter may be synchronized with variation of the load, so that external control of electro-magnetic compatibility of the DC/DC converter 2 can be realized.

Figure 10:
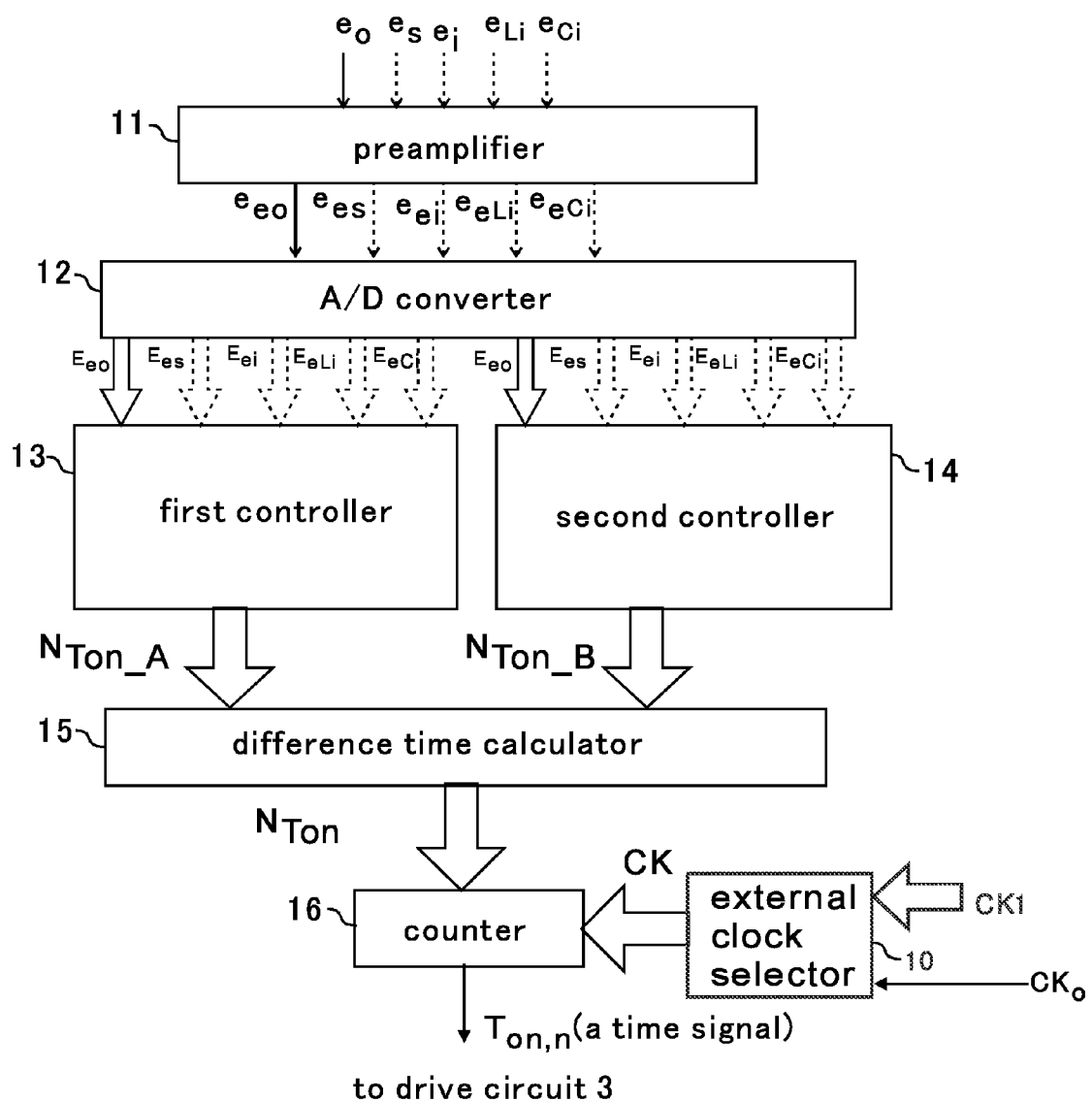
FIG. 10 is a functional block diagram of the control device of FIG. 8.

FIG. 10 is a functional block diagram of the control device of FIG. 9.

The control device 1B includes a preamplifier 11, an A/D converter 12, a first controller 13 (for example, a feedback controller such as a PID controller), a second controller 14, a difference time calculator 15, a counter 16, and an external clock selector 29.

The preamplifier 11 receives and amplifies at least one of the output voltage $e_o$, the output current $i_o$ (detected value $e_s$), the input voltage (DC power source voltage) $e_i$, the inductor current $i_L$ (detected value $e_{Li}$), and the capacitor current $i_C$ (detected value $e_{Ci}$), and outputs the amplified values as $e_{eo}$, $e_{es}$, $e_{ei}$, $e_{eLi}$, $e_{eCi}$. The A/D converter 12 converts such output values into digital signals $E_{eo}$, $E_{es}$, $E_{ei}$, $E_{eLi}$ and $E_{eCi}$, respectively. Meanwhile, the digital signals $E_{es}$, $E_{ei}$, $E_{eLi}$, and $E_{eCi}$ may be omitted, and thus arrows indicating data streams are shown as dotted lines in FIG. 9.

The first controller (feedback controller) 13 receives at least one of the digital signals $E_{eo}$, $E_{es}$, $E_{ei}$, $E_{eLi}$ and $E_{eCi}$, and generates a first time value $N_{Ton\_A,n}$ for switch-off timing as the amount of feedback control (where n is a subscript indicating the $n^{th}$ sampling).

The second controller 14, which is a machine learning controller such as a neuro controller, receives at least one of the digital signals $E_{eo}$, $E_{es}$, $E_{ei}$, $E_{eLi}$ and $E_{eCi}$, and generates a second time value $N_{Ton\_B}$ as the amount of control for the switch-off timing.

Also, as in FIG. 1, the second time value $N_{Ton\_B}$ may be represented by Expression (4) as follows.

$$N_{Ton\_B} = \alpha_n (N_{eo}^* - N_{eoEst})$$

For example, $N_{en}$; may be a target value with regard to the $n^{th}$ sampling, and $N_{eoEst.n}$ may be an estimated value in the nth sampling.

Further, $\alpha_n$ is represented by Expression (5) as follows.

$$\alpha_n = A \cdot \exp(-\lambda \times n)$$

The difference time calculator 15 obtains a difference between the first time value from the first controller 13, and the second time value from the second controller 14, and transmits this difference to the counter 16.

When counting up, the counter 16 transmits a timing instruction value (time signal $T_{ON}$) for turning on the switch circuit 22 to the drive circuit 3.

Since the clock signal of the counter 16 uses a signal synchronized with timing of an external synchronous signal $CK_o$, an increasing time of the timing instruction value (time signal $T_{ON}$) always has the same frequency as the external synchronous signal or a frequency higher or lower integer times of the external synchronous signal.

In estimation based on the output voltage detected value $e_o$, the process of the second controller 14 is the same as that described with reference to FIG. 3.

Description of Reference Numerals

| | |
|---|---|
| 1: control device | 2: DC/DC converter |
| 3: drive circuit | 11: preamplifier |
| 12: A/D converter | 13: first controller (feedback controller) |
| 14: second controller (machine learning controller) | |
| 15: difference time calculator | 16: counter |
| 22: switch circuit | 23 : transformer |
| 24: rectifier | 25 : smoothing inductor |
| 26: output capacitor | 27: output current detecting resistor |
| 28: load | 29: clock selector |
| 30: external synchronization control device | |

The invention claimed is:

1. A control device for a DC/DC converter, which obtains at least one of an output voltage value, an output current value, an input voltage value, an inductor current value, and a capacitor current value of the DC/DC converter, and transmits a switch on•off instruction signal to a drive circuit, the control device comprising:

a feedback controller which generates a first time value for switch-off timing as the amount of feedback control from the at least one of the output voltage value, the output current value, the input voltage value, the inductor current value, and the capacitor current value of the DC/DC converter, a machine learning controller which generates a second time value for switch-off timing as the amount of control from the at least one of the output voltage value, the output current value, the input voltage value, the inductor current value, and the capacitor current value of the DC/DC converter, and a difference time calculator which obtains a difference between the first time value from the feedback controller and the second time value from the machine learning controller, and transmits a difference signal to the drive circuit, wherein the machine learning controller multiplies a deviation between a control target value at a certain sampling and a control estimation value obtained from learning history by a weight of $\alpha = A \cdot f(n \cdot \lambda)$, where A is a factor (except for zero) for suppressing the first undershoot or overshoot, $f(n, \lambda)$ is a damping function, $\lambda$ is a factor (positive constant except for zero) for suppressing the second overshoot or undershoot, and n is an integer indicating the nth sampling, and calculates the second time value by imparting a bias component to the weighted value.

2. The control device according to claim 1, wherein $f(n, \lambda)$ is $\exp(-\lambda \times n)$.

3. The control device according to claim 1, wherein the machine learning controller comprises a memory unit which stores a calculated value of the second time value, a calculation start condition of the second time value, and a parameter for calculation of the second time value, the parameter being at least one of the output voltage value, the output current value, the input voltage value, the inductor current value, and the capacitor current value.

4. The control device according to claim 3, wherein the machine learning controller obtains resistance or impedance of load before and after transient variation from the output voltage and the output current of the DC/DC converter, and refers to a control estimation value corresponding to the resistance or impedance of the load from the memory unit.

5. The control device according to claim 3, wherein the machine learning controller obtains resistance or impedance of load before and after transient variation from the input voltage and the output current of the DC/DC converter, and refers to a control estimation value corresponding to the resistance or impedance of the load from the memory unit.

6. The control device according to claim 5, further comprising a clock selector selecting one clock from among a plurality of external clock signals, wherein generation timing of switching noise is synchronized with variation of load by synchronizing switch-on timing of the switch circuit with a selected external clock signal.

* * * * *